United States Patent
Cozza et al.

(10) Patent No.: US 11,909,623 B2
(45) Date of Patent: Feb. 20, 2024

(54) DEVICE PRESENCE METHOD AND SYSTEM FOR MESH NETWORK MANAGEMENT

(71) Applicant: LOUD-HAILER, INC, Kingston, NY (US)

(72) Inventors: Luca Cozza, Upper Nyack, NY (US); Arun Madhavan Panniyankara, Guragon (IN); Murali Jayaraman, Guragon (IN); Manoj Dixit Kumar, Guragon (IN); Cimon Butler, Kerhonkson, NY (US); Jack Chen, Kerhonkson, NY (US)

(73) Assignee: LOUD-HAILER, INC., Kingston, NY (US)

( * ) Notice: Subject to any disclaimer, the term of this patent is extended or adjusted under 35 U.S.C. 154(b) by 399 days.

(21) Appl. No.: 17/423,006

(22) PCT Filed: Jan. 15, 2020

(86) PCT No.: PCT/US2020/013676
§ 371 (c)(1),
(2) Date: Jul. 14, 2021

(87) PCT Pub. No.: WO2020/150349
PCT Pub. Date: Jul. 23, 2020

(65) Prior Publication Data
US 2022/0103456 A1  Mar. 31, 2022

Related U.S. Application Data

(60) Provisional application No. 62/792,527, filed on Jan. 15, 2019.

(51) Int. Cl.
*H04L 45/021*  (2022.01)
*H04W 8/00*  (2009.01)
(Continued)

(52) U.S. Cl.
CPC ........... *H04L 45/021* (2013.01); *H04L 45/20* (2013.01); *H04W 8/005* (2013.01); *H04W 40/24* (2013.01); *H04W 40/242* (2013.01); *H04W 84/18* (2013.01)

(58) Field of Classification Search
CPC ...... H04L 45/021; H04L 45/20; H04W 8/005; H04W 40/24; H04W 40/242; H04W 84/18
See application file for complete search history.

(56) References Cited

U.S. PATENT DOCUMENTS 8,462,662 B2    6/2013  Robins
9,973,441 B2 *  5/2018  Alasaad ................. H04L 45/20
(Continued)

OTHER PUBLICATIONS

International Searching Authority—International Search Report of PCT Application No. PCT/US2020/013676 dated Apr. 30, 2020 Entire document—2 pages Publisher: International Searching Authority Published country: USA.
(Continued)

*Primary Examiner* — Chandrahas B Patel

(57) ABSTRACT

A method and system for determining device presence in a mesh network and for directing messages to a destination within the network is presented. Node devices periodically issue device presences messages that are propagated through the network. Receiving devices store and analyze data from received device presence messages to determine presence and nodal distance to other nodes. Device presence message data can be used to route directed messages on the network and for network analysis.

16 Claims, 13 Drawing Sheets

| Interface | Source node | Role | Seq No | Hop Cnt | Timestamp | Receipt time | Interval | Aging Ct. |
|---|---|---|---|---|---|---|---|---|
| D2 | D4 | RS | 1 | 2 | 1578462472 | 1/8/2020 5:47 | 30 | 1 |
| D3 | D3 | RM | 2 | 1 | 1578462503 | 1/8/2020 5:48 | 15 | 0 |
| D10 | D9 | RS | 3 | 2 | 1578462514 | 1/8/2020 5:48 | 30 | 0 |
| D3 | D4 | RS | 1 | 4 | 1578462472 | 1/8/2020 5:49 | 30 | 1 |
| D2 | D7 | RS | 4 | 3 | 1578462568 | 1/8/2020 5:49 | 30 | 5 |
| D2 | D4 | RS | 3 | 2 | 1578462532 | 1/8/2020 5:50 | 30 | 0 |
| D3 | D3 | RM | 6 | 1 | 1578462518 | 1/8/2020 5:50 | 30 | 0 |
| D10 | D9 | RS | 4 | 2 | 1578462544 | 1/8/2020 5:50 | 30 | 0 |
| D10 | D8 | RM | 10 | 3 | 1578462609 | 1/8/2020 5:51 | 30 | 0 |
| D3 | D8 | RM | 10 | 3 | 1578462609 | 1/8/2020 5:51 | 30 | 0 |
| D10 | D6 | RM | 5 | 7 | 1578462637 | 1/8/2020 5:51 | 15 | 0 |

(51) Int. Cl.
*H04W 40/24* (2009.01)
*H04L 45/00* (2022.01)
*H04W 84/18* (2009.01)

(56) References Cited

U.S. PATENT DOCUMENTS

| | | |
|---|---|---|
| 10,050,865 B2 * | 8/2018 | Boudreaux ........... H04W 40/24 |
| 10,771,373 B2 * | 9/2020 | Watanabe ............... H04L 45/66 |
| 2009/0201143 A1 | 8/2009 | McKenna et al. |
| 2010/0302945 A1 | 12/2010 | Leppanen et al. |
| 2011/0141932 A1 | 6/2011 | Iwao et al. |
| 2015/0029914 A1 | 1/2015 | Elliott et al. |
| 2016/0323804 A1 | 11/2016 | Fujita et al. |
| 2018/0139683 A1 | 5/2018 | Kwon et al. |
| 2018/0367383 A1 | 12/2018 | Hardison et al. |

OTHER PUBLICATIONS

International Searching Authority—Written Opinion of PCT Application No. PCT/US2020/013676 dated Apr. 30, 2020 Entire document—12 pages Publisher: International Searching Authority Published country: USA.

\* cited by examiner

| "DP" | SrcNodeID | Role | Seq # | HopCnt | TimeStamp | Interval | CRC |
|---|---|---|---|---|---|---|---|
| 2 | 4 | 1 | 1 | 1 | 8 | 1 | 2 |

[44503C8801000201 0123E2B65B000000014EAC3]

FIG. 4C

| Interface | Source node | Role | Seq No | Hop Cnt | Timestamp | Receipt time | Interval | Aging Ct. |
|---|---|---|---|---|---|---|---|---|
| D2 | D4 | RS | 1 | 2 | 1578462472 | 1/8/2020 5:47 | 30 | 1 |
| D3 | D3 | RM | 2 | 1 | 1578462503 | 1/8/2020 5:48 | 15 | 0 |
| D10 | D9 | RS | 3 | 2 | 1578462514 | 1/8/2020 5:48 | 30 | 0 |
| D3 | D4 | RS | 1 | 4 | 1578462472 | 1/8/2020 5:49 | 30 | 1 |
| D2 | D7 | RS | 4 | 3 | 1578462568 | 1/8/2020 5:49 | 30 | 5 |
| D2 | D4 | RS | 3 | 2 | 1578462532 | 1/8/2020 5:50 | 30 | 0 |
| D3 | D3 | RM | 6 | 1 | 1578462544 | 1/8/2020 5:50 | 30 | 0 |
| D10 | D9 | RS | 4 | 2 | 1578462518 | 1/8/2020 5:50 | 30 | 0 |
| D10 | D8 | RM | 10 | 3 | 1578462609 | 1/8/2020 5:51 | 30 | 0 |
| D3 | D8 | RM | 10 | 3 | 1578462609 | 1/8/2020 5:51 | 30 | 0 |
| D10 | D6 | RM | 5 | 7 | 1578462637 | 1/8/2020 5:51 | 15 | 0 |

FIG. 5

| Ref | Interface | Device | Role | Seq No | Hop Cnt | Timestamp | Interval | Aging Ct. |
|---|---|---|---|---|---|---|---|---|
| # Bytes | 4 | 4 | 1 | 1 | 1 | 8 | 1 | 1 |

FIG. 6

| Reference | Interface | Device | Role | Timestamp Begin | Timestamp End |
|---|---|---|---|---|---|
| # bytes | 4 | 4 | 1 | 8 | 8 |

DEVICE PRESENCE METHOD AND SYSTEM FOR MESH NETWORK MANAGEMENT

CROSS-REFERENCE TO RELATED APPLICATIONS

This application claims priority from U.S. Provisional Patent Application No. 62/792,527 filed Jan. 15, 2019, the entire contents of which is expressly incorporated by reference.

FIELD OF THE INVENTION

The present invention relates to a communication protocol and method and system utilizing the same to determine the presence of and paths to node devices in a mesh network and efficiently routing messages to such devices.

BACKGROUND

Automation of various industrial processes and consumer applications aims to increase productivity by joining many devices into a common network. One implementation is in the context of an Internet of Things (IoT) environment in which various IoT devices connect to neighbor devices in a mesh network and data and messages are passed between devices on the network. Another type of mesh network is a messaging network where devices, such as cell phone and tablet computers, connect to nearby devices using an RF protocol such as WiFi or Bluetooth. As the network grows, a message can be carried from one device through various intervening networked devices to a destination that would otherwise be out of RF range. Presence of or absence of nodes in the system can greatly impact system performance and usability of the network to meet its goals.

In a mesh network, the devices that serve as network nodes may be continually entering and leaving the network. One issue faced in present network systems is routing messages to a destination. Related to this issue is the need for an efficient way to determine a current mesh network topology and distribute relevant network topology data to the various node devices for use in message routing and other functionality.

SUMMARY

These and other issues are addressed, and improvements provided by a method and system as disclosed herein wherein node devices announce their presence in an network by sending device presence messages (DP messages) upon joining a mesh network and periodically thereafter while they remain in the network. The message identifies the node ID of the origination node and contains a hop count value initially set at one. Each receiving node can forward the message along to other adjacent nodes, incrementing the hop count value of the device presence message.

Information in device presence messages can be used by a recipient node device to build a local Device Presence table (DP table) containing information about the network topology from the view of the receiving node, including the nodal distance to other nodes in the network along different paths. Information stored in the Device Presence Table can be used to efficiently forward directed messages within the network, such as for peer-to-peer network messaging applications. Node devices can also upload, periodically or on request, information from the Device Presence Table to a remote device, such as a network cloud-based system where the data can be used for network analysis and other features. Log files can be generated at a node device and which indicate when various other node devices in the network entered and left the network or otherwise became inaccessible to the device maintaining the log. This information too can be provided to a remote server for network analysis.

Various embodiments of the invention can be implemented using a wide variety of network protocols and network topologies. The improved routing provides increased network efficiency for applications such as instant messaging among members of a local mesh network. Specific implementations can have very low memory and processing requirements allowing the method to be implemented in a wide variety of small low-power devices used in many different network applications, including IoT applications.

DESCRIPTION OF THE DRAWINGS

Various features and advantages of the invention, as well as structure and operation of various embodiments and implementations of the invention, are disclosed in detail below with reference to the accompanying drawings in which:

FIG. 4A-4C illustrate a device presence message format according to an embodiment;

FIG. 5 illustrates the content of a sample Device Presence Table;

FIG. 6 shows a particular format for entries in the table of FIG. 5;

DETAILED DESCRIPTION

Figure 1:
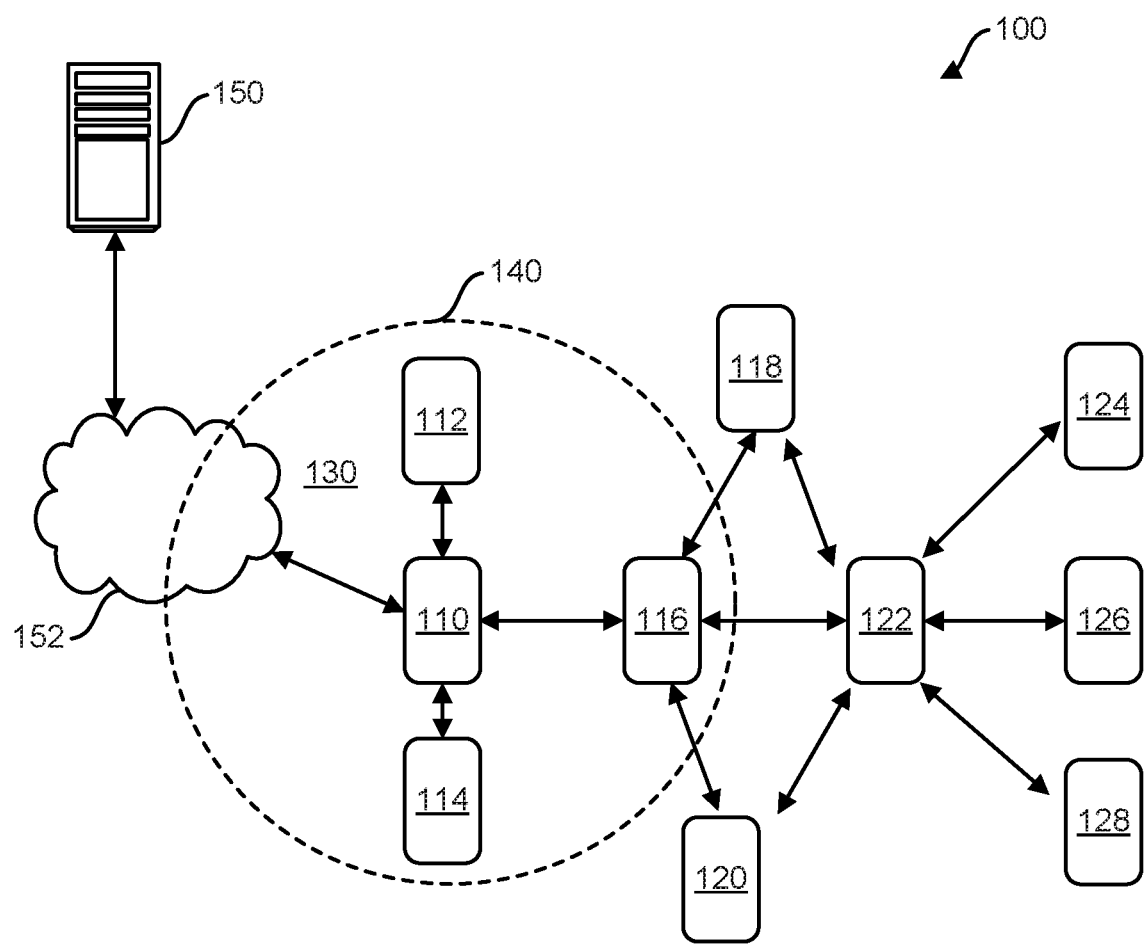
FIG. 1 is an illustration of a particular mesh network environment.

FIG. 1 is an illustration of a particular mesh network 100 in which a series of computing devices 110-128 are interconnected with each other. The devices can be computing devices, such as PCs, wireless access points (AP) or relays, smart phones, tablets, or IoT devices such as consumer electronic products, remote sensors and tags, and device controllers. Each such device is connected to one or more other devices via a respective wireless communication protocol, such as Bluetooth or Bluetooth LE, WiFi, Zigbee, Z-Wave, and others. The particular protocol used and number of permissible connections to a given node is dependent on implementation and a single device may be connected to different adjacent devices using different protocols. For example, device 100 is shown with data links to devices 112, 114, and 116. Device 110 could be an access point connected to an IoT device 112 via Zigbee, a local data server 114 via Bluetooth and a smart phone 116 via a WiFi connection. Device 116, likewise can be connected to three additional devices 118, 120, and 122 using the same or different communication protocols. In a radio wireless network, a device can only directly detect devices that are within RF range. Thus, Device 110 having RF range 140 can detect devices 112, 114, and 116 but the remaining devices in the network 118-128 are hidden. Device 110 can also be connected through a network 152, such as a LAN, WAN or the Internet, to a remote server or other device 150.

In a particular configuration, the devices 112-128 are handheld smart devices and device 110 is a relay device that provides a bridge between the mesh network and the Internet. Devices 110-128 are connected to each other using Bluetooth LE and execute communication software that allows user messages to be passed between devices in the mesh network. One specific network embodiment is disclosed in U.S. Pat. No. 10,448,219 entitled "Local and Temporal Method and System of Broadcasting Via Peer-to-Peer Network", the entire contents of which is expressly incorporated by reference.

Figure 2:
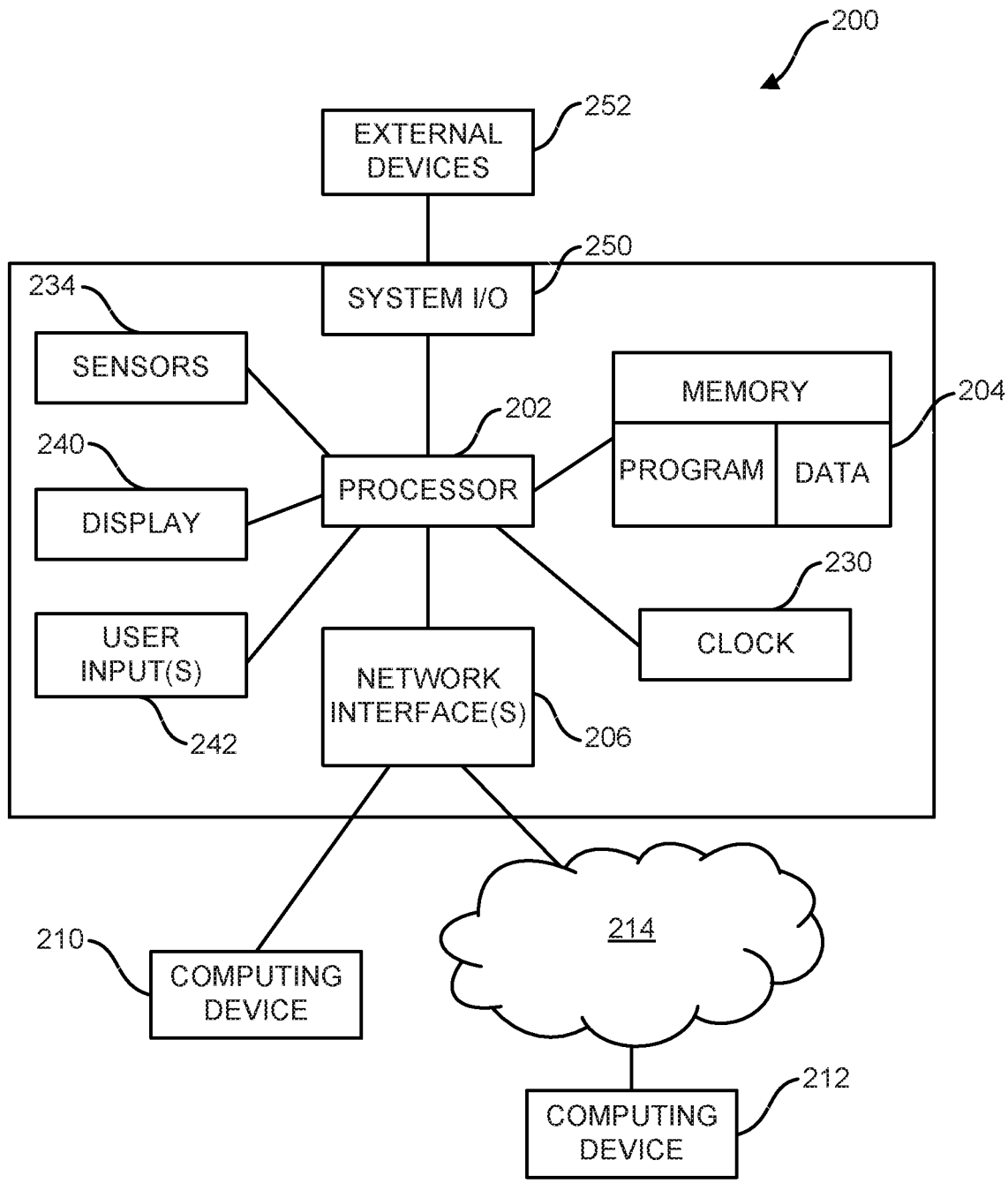
FIG. 2 is a high level diagram of a particular computing device that can be used as a mesh network node device according in an embodiment.

FIG. 2 is a high level diagram of a particular computing device 200 that can be used in a mesh network environment, such as that of FIG. 1, to implement embodiments of the invention as disclosed herein. Device 200 includes a processor 202 coupled to various system components as shown. The processor can be a single device, a multi-core processor, or multiple separate processors operating in conjunction with each other. A memory 204 is used for storing the operation system and application computer program instructions that are executed by the processor to cause it to perform various functions, such as those discussed herein. The memory 204 can be RAM, a combination of RAM and ROM, and can be a single memory component or multiple memory components, such as a primary memory, a secondary memory internal or external to the device 200, and comprising include solid state and mechanical storage.

Appropriate network interface(s) 206 are provided to allow the device 200 to communicate with remote devices, such as devices 210 and 212. Different communication protocols will typically have their own network interface hardware, firmware and/or software. For example, device 200 may have interfaces 206 supporting WiFi, Bluetooth, and cellular data communications for wireless communication and an Ethernet port to allow wired connection to a network 214. Device 200 can include a clock 230 which may be a dedicated clock or a device, such as GPS, that can provide a clock signal. Internal sensors 234 can be provided to measure environmental and other features so that this data can be sent to other devices over the network. Depending on the type of device, a display 240 can be provided to provide visual output to a user. A user input device 242, such as a keyboard or touchscreen, allows for user input. Additional system I/O 250, such as USB ports, may also be provided as appropriate to permit connection other external devices 252, such as external keyboards, displays, sensors, etc.

Figure 3:
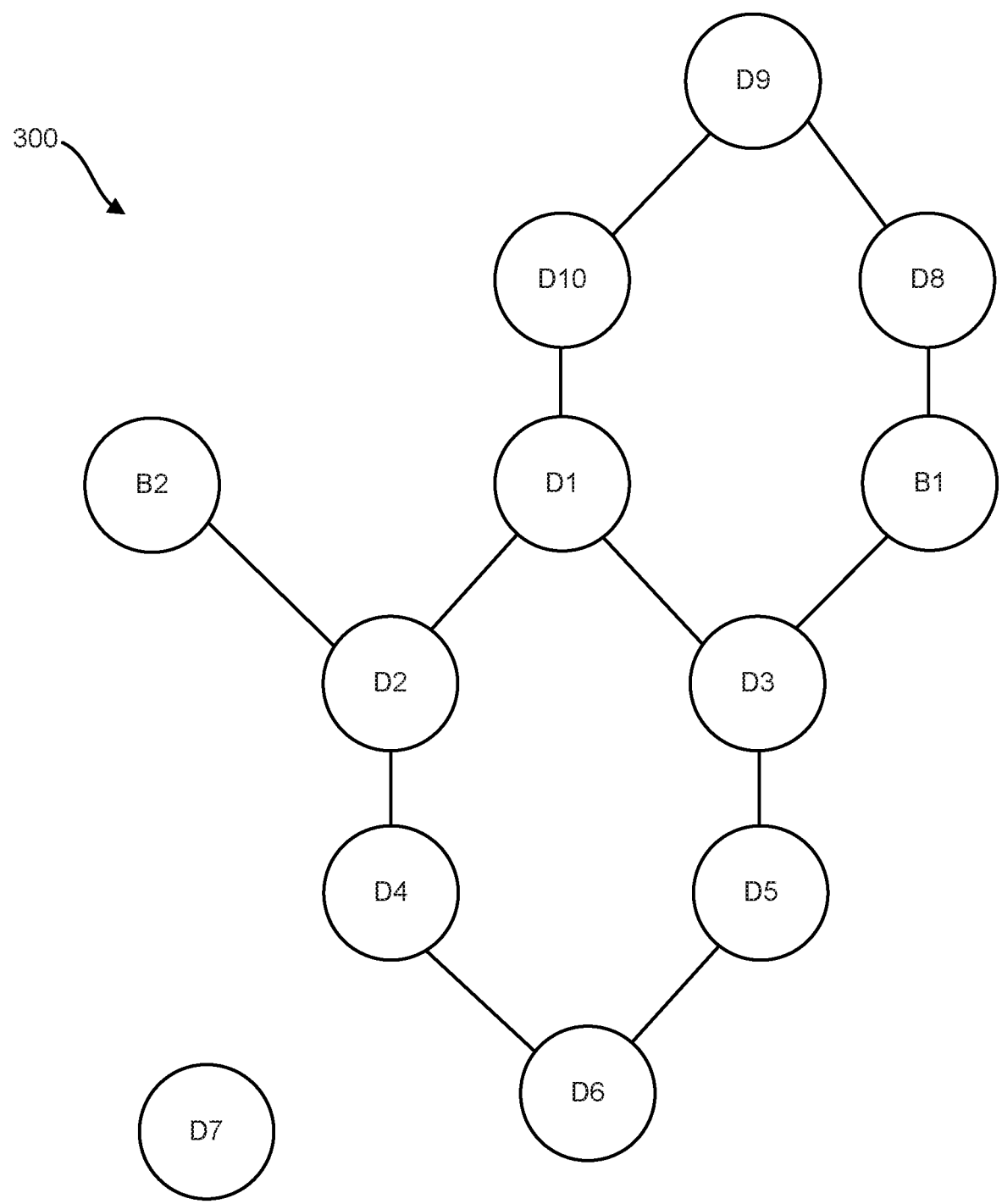
FIG. 3 is a nodal diagram of a mesh network 300 comprising a variety of connected node devices.

FIG. 3 is a nodal diagram of a mesh network 300 comprising a variety of connected node devices. Devices B1 and B2 represent gateway nodes that allow communication between devices in the mesh network 200 and devices outside of the mesh network 200. Devices D1 through D10 can be any computing device connected to the network, such as a smart phone running an appropriate mesh networking app. Each of the devices B1-B2 and D1-D10 functions as anode in the network 300. The number of links between nodes is exemplary and each node may have more or fewer than the connections shown.

Each node device has a respective node ID. In some embodiments, the node ID is a unique device ID, such as a unique MAC address assigned by the manufacturer to a piece of network hardware that is connected to the network. Alternatively, the node II) can be assigned to the node device in an appropriate manner, such as during a registration or log-in process granting the device appropriate access to the network. Each node ID should be at least locally unique to the particular network. Additional identifying information can be associated with the node ID, such as a username or handle of the user operating the node device.

A node device in the mesh network 300 can only 'see' via the network those adjacent devices to which it is directly connected. A process as set forth herein is executed by the node devices in the network to create locally stored Device Presence Tables containing information identifying the node devices that are in the network and providing information about the path or paths in the network over which data can be sent from one node to another. Additional information can be developed to track when node devices enter and leave the network and how long they remained connected. Each node device implementing the invention can have its own table reflecting the network as seen from its perspective.

In operation, participating nodes in the network periodically initiate a Device Presence ("DP") message that is sent to adjacent nodes in the network in a manner appropriate for the network protocol. For example, the DP message can be generally broadcast for receipt by all devices within range or can be sent discretely to each adjacent node device. Otherwise, the DP message can be sent to each adjacent node separately. Each DP message comprises various data fields including data indicating the source node ID of the node where the message was originated and a hop count, which can initially be set to one. A node device that receives a DP message generates a modified version of the received message that includes at least some of the same content, including the origination node, but with a hop count incremented by one. The modified message is forwarded to other adjacent nodes in the network. Those downstream nodes can also forward the DP message with further incremented hop counts.

A node device receiving a DP message parses the message to extract data therein. A corresponding record is added to a Device Presence table maintained in the node device's memory. The stored information can include the originating node indicated in the DP message and the hop count. If the DP message includes a record of prior nodes that it has passed through that information can also be stored. After a period of time has passed, the internal table maintained by a particular node device will contain a record of participating node devices that are present in the network and can be reached within the maximum specified number of hops, along with the nodal distance for each path to that node device. In some instances, instead of adding a new record to the DP Table for each DP message received, an existing record in the DP Table can be modified or replaced instead as may be appropriate In addition to the origination node ID and hop count, various other data values can be contained within a DP message and some or all of these added to the DP Table or other data records maintained by the node device. A DP message can include a sequence number provided by the originating node when the DP message is originated. Subsequent DP messages originated at the same node can have different sequence numbers. For example, the sequence number can have a value between 0 and 255 and be incremented, with rollover, each time a new DP message is originated from that node device. The sequence number can be used to identify DP messages that originated from the same device but at different times and used to identify instances where the same message arrived at a receiving node at different times because it was forwarded through different paths.

A DP interval value can be specified to indicate the period at which the originating node sends subsequent new DP messages. For example, a node device configured to originate a new DP message every 5 seconds could have a DP interval value of 5. A Timestamp value, such as Unix time specifying a number of seconds since the Unix epoch, can be included to indicate when the DP message was originated. To allow the DP message to be distinguished from other messages sent on the network, a header or packet identifier, such as "DP" can be included. A Role value can be used to provide information about the type or role served by the originating node device. In one example, the Role can indicate if the node device is operating as a gateway, a master device, a slave device, or in a different capacity.

To avoid flooding the network with forwarded DP messages, a node device can stop forwarding a received DP message if its hop count reaches a maximum threshold value, such as 10. Other ways to stop propagation of DP messages can also or alternatively be used. A received DP message need not be forwarded if that received message originated at the receiving node. If attributes of the received message or other data indicate that the message has traversed a loop in the network, it does not need to be forwarded back into that loop. A node device can be configured to record for each particular DP message that it has forwarded data that allows the message to be uniquely identified and to identify which adjacent nodes to which the respective message has been forwarded. If the same message subsequently arrives at the node device, it does not need to be forwarded to any adjacent node that has already received it.

Preferably, a DP message is small enough in size that it can easily be managed by conventional operating systems and communication protocols in a single message. FIG. 4A illustrates a particular packet format containing the data fields addressed above and indicating the size of those fields in bytes. Also included is a CRC value that can be calculated based on the remaining values of the packet. In this embodiment, the packet format for a DP message is only 20 bytes. FIG. 4B is an illustration of a sample originated DP message packet arranged as set forth in FIG. 4A and where the node device has a DP message interval of 20. FIG. 4C is an illustration of a packet for the message of FIG. 4B in hexadecimal format. The order and size of the data fields can be varied and not all fields are required. Other fields can also be included. In some embodiments, the DP packet need not have a fixed length.

FIG. 5 is an example of a portion of a Device Presence table 500 maintained in memory for device D1 shown in FIG. 3 after node devices in the network 300 have broadcast an originated DP message to adjacent node devices and the originated DP messages have propagated through the network 300 with a hop limit of 10.

DP Table 500 contains a series of records, illustrated in FIG. 5 as table rows, which store a respective source node value, an origination node value, and a hop count value. While the DP table is discussed herein as a series of data in a table in memory, in other embodiments, alternative ways of storing the data can be used including, for example, entries in a relational database Each record in the DP Table 500 is associated with a received DP message. Record can store value for the origination Source Node device 504 and hop count 510 as well as values for the initiating device's Role 506, message sequence number 508, a time of receipt 514, aging interval 516, and an aging count 518. Values for most of these respective fields can be taken directly from the corresponding values of the respective incoming DP message. With respect to the hop count 510, if a receiving node device processing an incoming DP message references an incremented hop count, such as used in when forwarding the incoming DP message, the hop count value should be decremented when storing that value the DP Table record for that incoming DP message.

A DP Table record can include an Interface field 502 with data that identifies the adjacent node from which the DP message reflected by the record was received. In one embodiment, the sending node's ID is included as part of the overall data communication protocol and so can be extracted by the internal network communication software layers operating on the receiving node device. Alternatively, a node device can insert into the DP message or other fields its device ID.

A populated DP Table generated by and stored in a particular device identifies each node device that is known to be in the network and can that can be reached, directly or indirectly, from that device along with nodal distance (hop count) and the adjacent node for that path. Where DP messages are forwarded only if the hop count does not exceed a threshold, such as 10, only those devices that are reachable within the threshold hop count will appear in the DP table. As new devices join the network, they will appear in the DP table once their DP message is received. As devices leave the network or are repositioned so the shortest nodal distance to them exceeds the threshold, the devices will be aged out of the DP table.

With reference to DP table 500 of FIG. 5 and network of FIG. 3, record 520 shows that device D1 received a DP message from adjacent device D2 that originated at device D4 with a sequence number of 1 at the specified timestamp and was received at D1 at the specified receipt time. The hop count of 2 indicates that there is one intervening node between device D1 and device D4. Record 522 shows that device D1 received a DP message from adjacent device D3 that that originated at device D3, arrived at device D1 with a hop count of 1 along with the origination and receipt timestamps.

With reference to FIG. 3, it can be seen that a message leaving node D4 can reach node D1 by being passed through node D2, reaching node D1 after one hop and this is reflected in record 522. The same message from node D4 can reach node D1 by passing through nodes D6, D5, and D3, and arriving at node D1 after 4 hops. The data in record 524 reflects the fact that there is a further path from node D4 to node D1 passing last through node D3 and arriving at node D1 in 4 hops. The dual path from node D4 to node D1 is discernable because the data in records 520 and 524 have the same originating source and sequence number (as well as origination time stamps) but different hop counts.

In an embodiment, if the same DP message (e.g., having the same originating node and sequence number) arrives at a receiving device from different neighbor devices, this indicates that there are (at least) two paths to get to the originating device form the receiving device. Separate records can be stored for both of them in the DP table. If the same DP message is received from the same neighbor node, a record reflecting the smallest hop count (generally the first record received) can be discarded. Alternatively, the multipath messages may be stored, or separately logged, for subsequent use in analysis of the network configuration and performance, or for other reasons.

Device D7 is not reachable through this mesh network and will not appear as a source node device in the DP table 500. (The fact that D7 is not listed does not preclude the possibility that device D1 could communicate with device D7 through other means, such as via a data link separate from the mesh network.)

Time stamp value 512 and Receipt time 514 in the DP Table can be used to store the time when the DP message corresponding to a given record originated and when it was received. The time difference can be used to determine the overall data transmission speed between the originating and receiving nodes on the path traveled.

A DP Table record can also include an aging count value which is set to an initial value, such as 0 or a value calculated with reference to the origination timestamp and interval, and then periodically incremented. When the aging count exceeds a threshold value, such as 5, the respective record can be deleted from the DP table. More generally, the count can be set to an initial value and periodically adjusted, such as by incrementing or decrementing the value by one. A DP Table Refresh process can be run at a periodic interval, such as 5 seconds. A record purge is indicated when the aging count for that record passes the threshold value. When a record is aged out, it can be assumed that the path between the respective source node for the record and the node device at issue has been broken unless a more recent record for that node and path is present. If all records with that device as the source node have been timed out, it can be assumed that the source node itself is otherwise no longer in the network within the maximum hop count at least as viewed from the instant device.

In an embodiment, all entries in the table are aged at the same rate and the refresh process will adjust the aging count of each entry in the DP Table each time the process is run. In another embodiment, the aging count of a particular record in the DP Table is adjusted at time intervals specified for that record. Different records can have different interval values. The aging interval used in the aging process of a given record can be the aging interval specified in the received DP message. Interval values can be specified by other means as well, such as based on the originating node device's role specified in the DP message. The aging count can be based on the origination timestamp. For a message with a timestamp T0, an interval of 30 seconds and an aging threshold of 5, the message will age out after T0+150 seconds. It is possible for message that takes a long time to propagate through the network to have an initial aging count that is near the threshold.

When the DP Table Refresh is run, a time difference between the current time at the node device and the record timestamp 512 is determined. The aging count is adjusted when the time difference for that record meets or exceeds the specified interval for that record. The timestamp value 512 for that record can be changed to the current time. The frequency at which DP Table Refresh is executed can vary.

In an embodiment, whenever a new DP message is received and the DP Table updated, the refresh is rescheduled to run at a period which is equal to or less than the minimum Interval value contained in the DP Table.

Other methods of aging out records may also be used and aging may alternatively be calculated with reference to the receipt time stamp.

In a further alternative, instead of a separate aging count, a record can be purged when the difference between the current time at the node device and the DP message for a record was originated (or received) is equal to or greater than the interval value multiplied by an aging factor, such as 5 seconds. For simplicity in this embodiment, the receipt time and interval value times the aging factor can be calculated at the time a DP message is received to determine an expiration time. The expiration time can then be stored in the DP Table instead of the interval and aging count.

Figure 7:
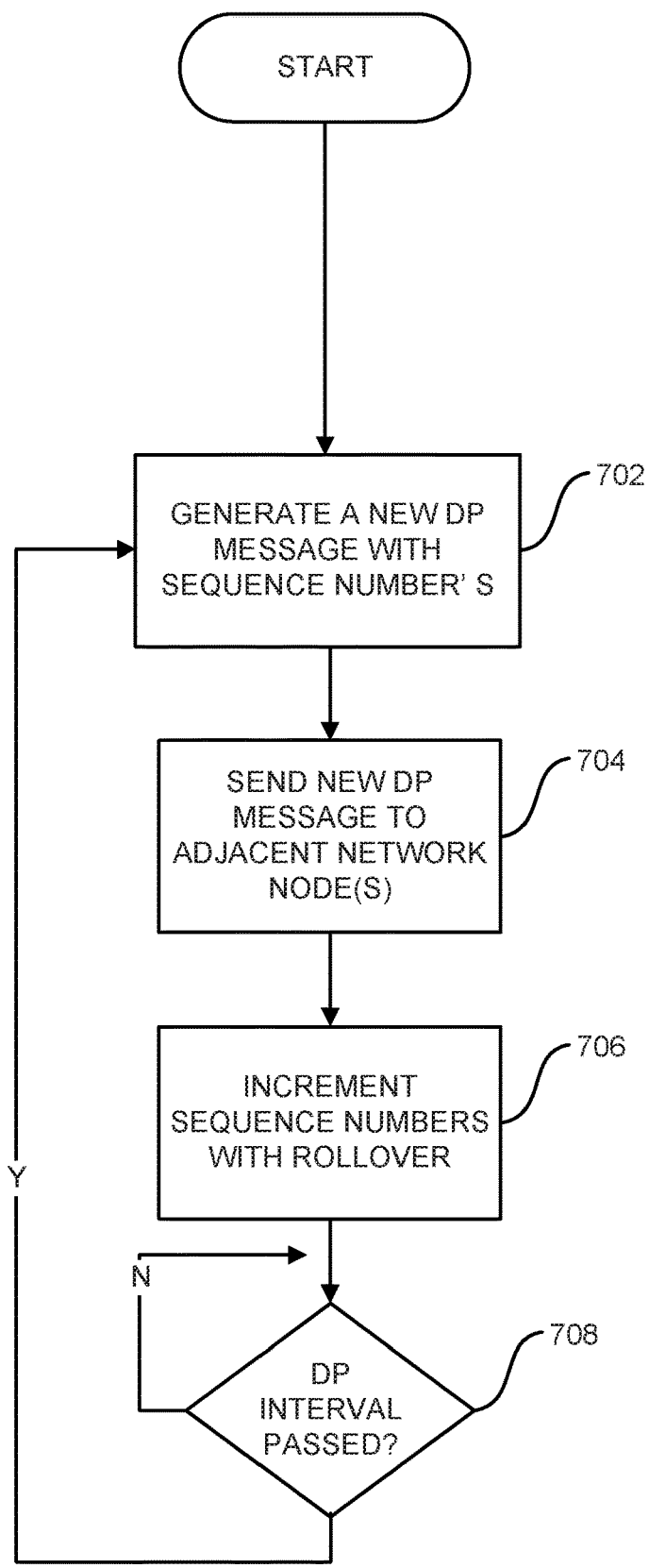
FIG. 7 is a high level flowchart of a device presence message origination process that can be executed on a node device according to an embodiment.

FIG. 6 shows a particular format for entries in a DP Table of FIG. 5 indicating the size in bytes of each data value. In this embodiment, each row in the DP Table requires 21 bytes total. This allows for DP Tables to be stored in a small amount of device memory FIG. 7 is a high level flow of a particular DP message origination process that can be executed on a node device. At step 702, a new DP message is generated with content as discussed above and an initial sequence number S. The message is sent to adjacent network nodes (step 704). The sequence number is incremented with a rollover (e.g., 255 incremented to 0) and the process waits until the DP interval period has passed. (Steps 706, 708). The process then repeats.

Figure 8:
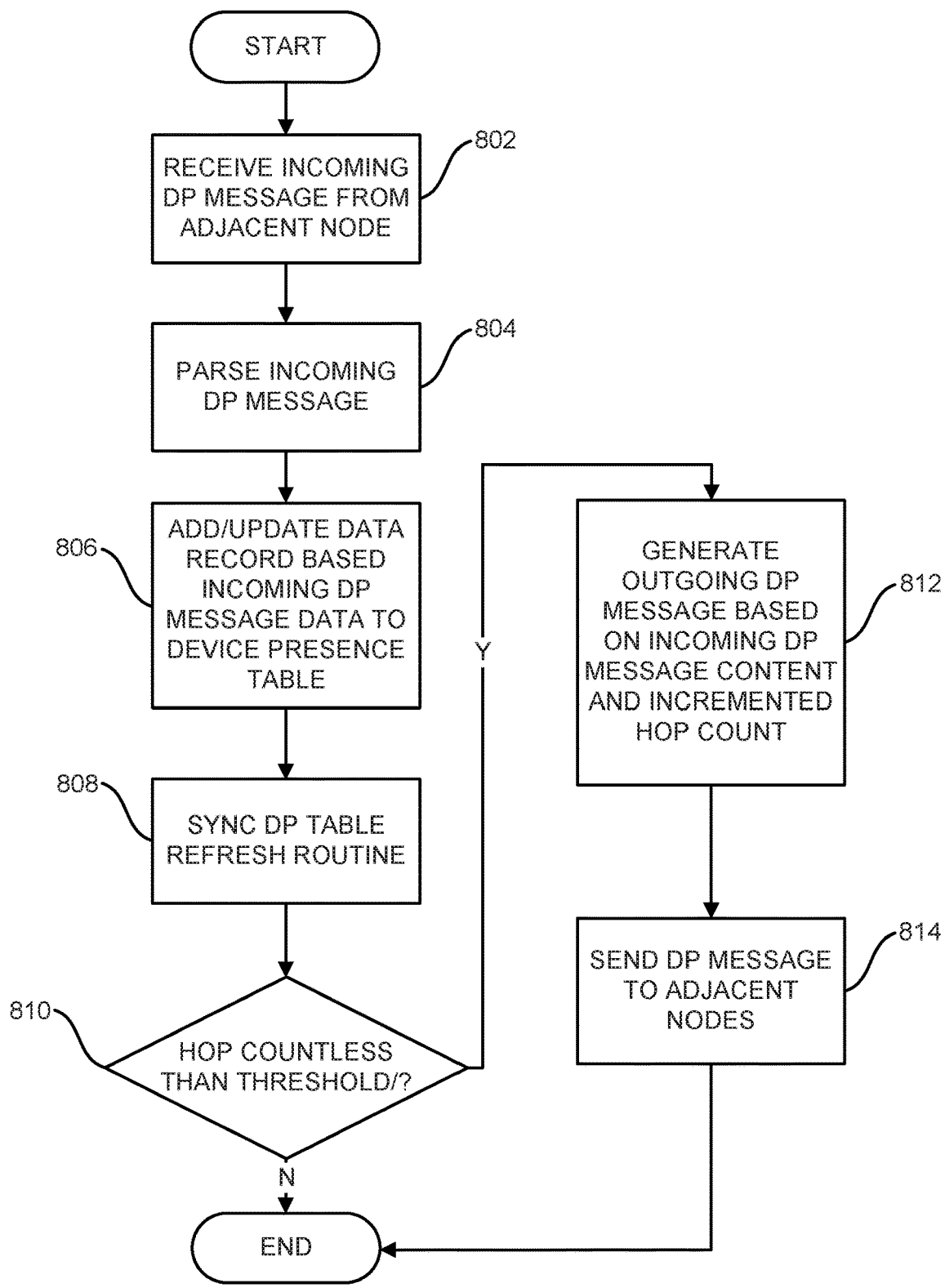
FIG. 8 is a high level flowchart of a process for handling receipt of an incoming device presence message from an adjacent node according to an embodiment.

FIG. 8 is a high level flowchart of a process performed on receipt of an incoming DP message from an adjacent node. When a DP message is received (step 802), the incoming message is parsed (step 804) to extract the message contents. A new record is added to the device presence table in memory with the data contents as discussed herein. (Step 806). The DP table refresh routine can be refreshed (step 808). If the hop count of the incoming message is less than a threshold (step 810), an outgoing DP message is generated based on the content of the incoming message but with an incremented hop count (step 812), the outgoing DP message is sent to adjacent nodes (step 814), and the process ends. If the hop count is not less than the threshold (step 810), no forwarding occurs, and the process ends.

Figure 9:
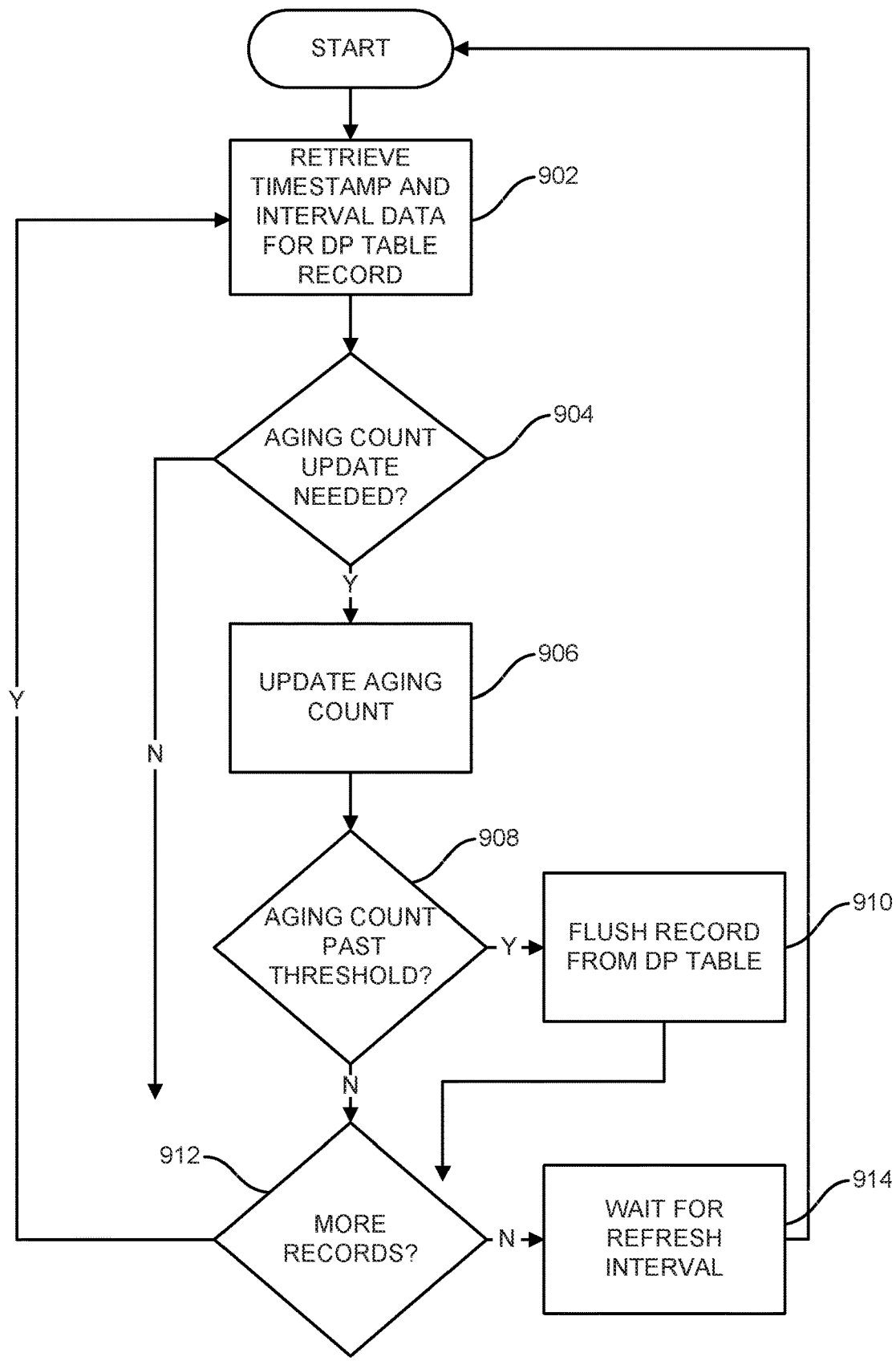
FIG. 9 is a high level flowchart of a device presence table refresh process according to an embodiment.

FIG. 9 is a high level flowchart of a DP Table Refresh process. When the process is initiated, data, such as timestamp and interval data for a record in the DP Table, is retrieved (step 902) and a determination is made about whether the aging count needs to be updated. (Step 904). If so, the aging count is updated (Step 906) and compared to the threshold (step 908). If the threshold is passed, the record is flushed from the DP Table (step 910). The process is repeated until all table records are processed (step 912). After the appropriate refresh interval has passed, the refresh routine is repeated (step 914).

The contents of the DP Table can be used to increase the overall network efficiency when processing non-DP messages directed to a specific node. When a node X receives from an adjacent node a non-DP message directed to Node Y, instead of forwarding that message to all other adjacent nodes in the network (which can be done when node X does not have details about other the devices that are in the network), node X can instead forward the message only to those nodes that the data in its DP Table indicates have a connection to node Y. This condition is indicated by a record in the DP Table having destination node Y as its origination source node. This process can be further refined to send the message only to adjacent nodes that have a connection to Y within a maximum hop count. In one embodiment, the records in the DP Table are filtered to identify the set of records that have node Y as a source node. From these, records with the lowest hop counts (such as the lowest 1 or more records from the set) and the non-DP message is forwarded to the adjacent interface node specified in the respective record.

Figure 10:
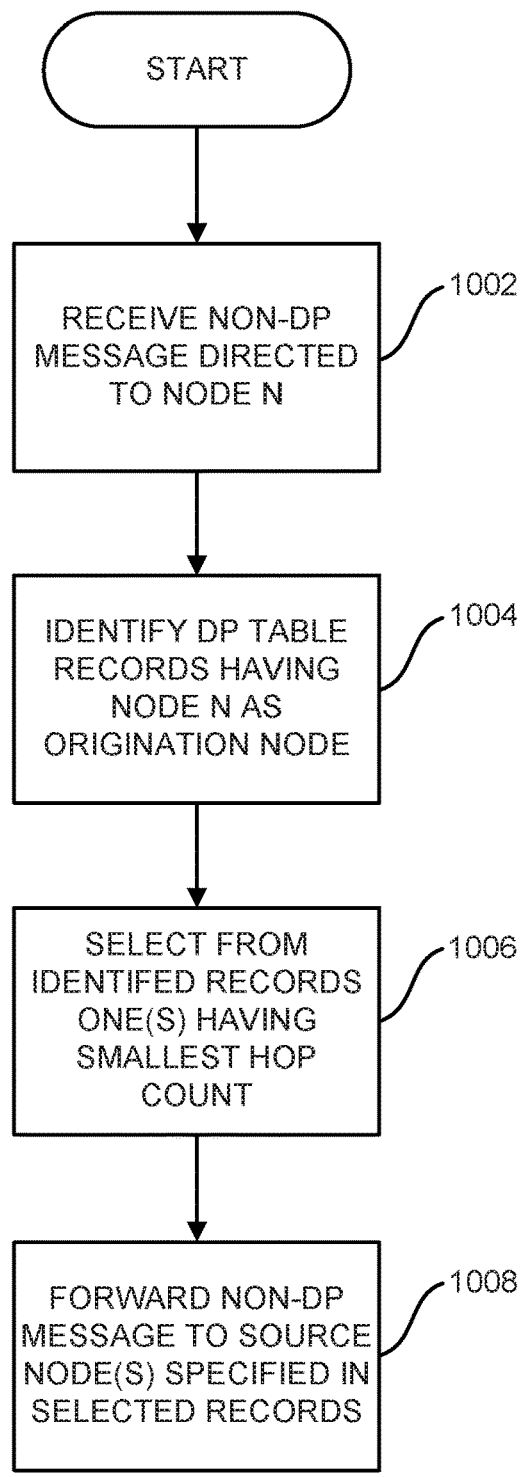
FIG. 10 is a high level flowchart of a process for routing a non-device presence message according to an embodiment.

FIG. 10 is a high level flowchart of a particular process to determine routing of a non-DP message. When a non-DP message directed to node-N is received (step 1002), records in the DP Table having node N as the origination node are identified (step 1004). A selection is made from the identified records of one or having the smallest hop counts. (Step 1006). The non-DP message is then forwarded to the source nodes specified in the selected records (Step 1008)

In an embodiment, which is well suited when a node device is a user's computing device such as a tablet or smart phone, the DP Table can be used in instant messaging applications. In such a case, the non-DP message input to the node X device by the node X device's user is directed to the user associated with Node Y. To assist in the messaging application, a software process in the DP Device can output on a display a list of reachable node devices based on information in the DP Table. Preferably, the output shows user IDs that are associated with the respective device IDs of the node devices. The user can then, using a suitable user interface, input a message and select the destination for the instant message from the available user IDs. One or more non-DP messages can then be generated directed to the corresponding node ID and containing the user's input message. The non-DP message is then sent to adjacent nodes using the same process as discussed above for forwarding non-DP messages received from an adjacent node.

Figure 11:
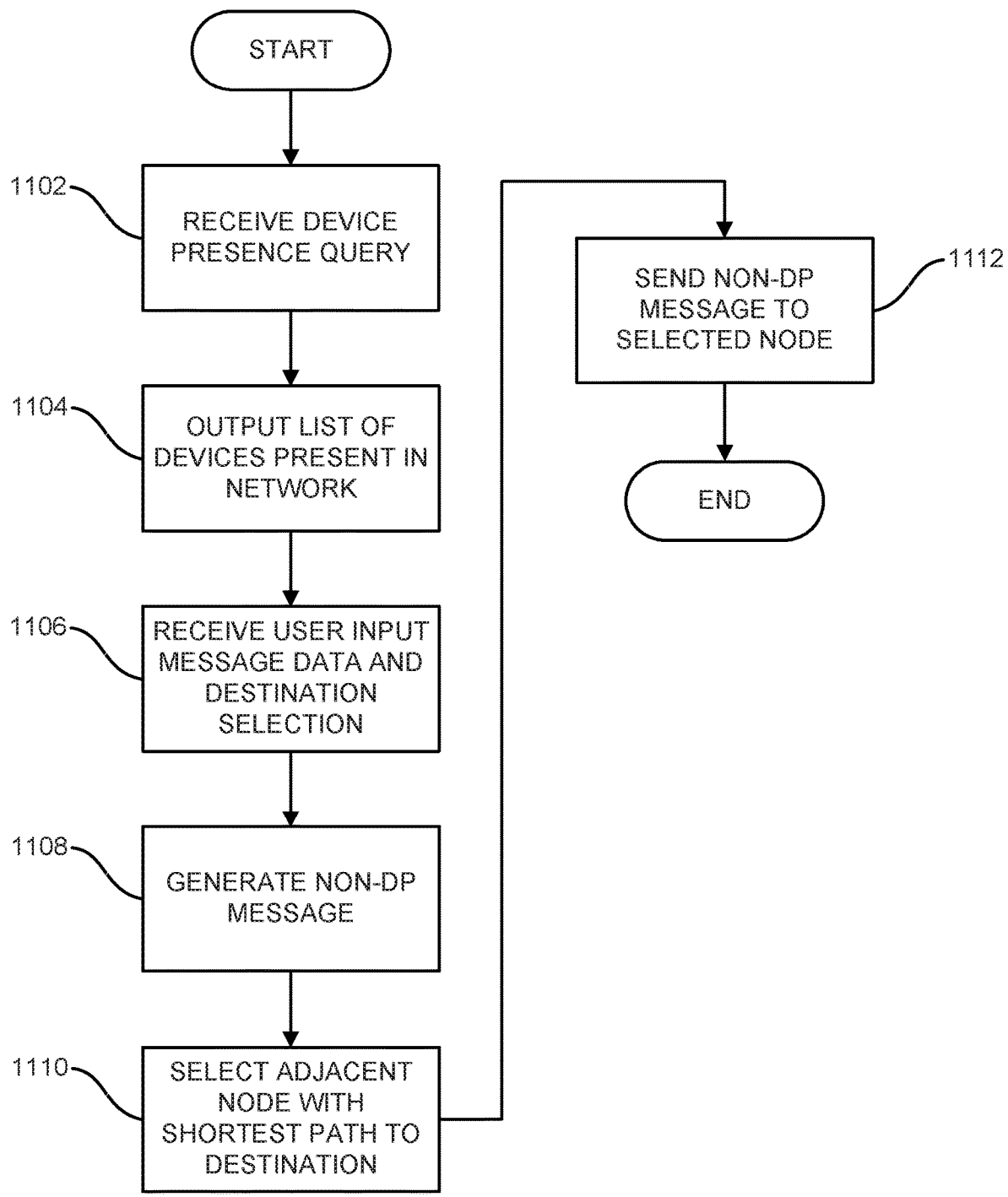
FIG. 11 is a high level flow chart of a process for instant messaging over a mesh network according to an embodiment.

FIG. 11 is a high level flow chart of a process for instant messaging over the mesh network. In step 1102 the system receives a device presence query via a user interface input 242. This query can be generated by a messaging App executed on the node device seeking to obtain a list of users to which messages can be sent over the mesh network. The device presence query can be initiated by the App automatically, such as when the App is started and on a periodic basis while the App is running. It can also be initiated in response to a user request via a suitable interface to obtain or update the user list. In response to a device presence query, the user's device analyzes data in its DP Table to extract a list of origination node IDs. Such a list will indicate the node devices in the mesh network that can currently be reached from the user's device. This information will then typically be mapped to user names associated with the IDs. If network membership is known in advance this mapping can be provided to the user's device in advance. In a variation, when a node device joins the network it can broadcast a special message containing the node device ID and the user-name associated with that device. Receiving node devices can process the data to generate an ID mapping table and propagate the message throughout the mesh network in the same manner as a DP message as discussed above. The user ID could also be included in an originated DP message itself, such as in an optional data field, and possibly subsequent originated DP messages. To reduce network bandwidth usage, user ID data could be sent only intermittently, such as every fifth, tenth, or twentieth originated DP message.

Returning to FIG. 11, a list of (reachable) devices present in the network is output to the user (step 1104), such as on display 240. A conventional user interface is provided so the user can input one or more destination IDs for their message. (Step 1106). The user interface could also allow a user to enter IDs without first pulling up a pick list or the interface could suggest ID options from the IDs in the network as the user enters a particular ID. User input of message data, such as text, images, video, or audio data, is also received. (Step 1106). A non-DP message (i.e., a message other than a Device Presence message) is generated containing the input message data and is directed with the selected ID as its destination. (Step 1108). The DP Table data is used, as discussed above, to select one or more adjacent nodes having shortest hop distances to the destination (step 1110) and the message is then sent to the selected adjacent node or nodes (step 1112).

In addition to maintaining a DP Table, the node device can also maintain a separate DP log identifying node devices and when they have (from the view of the node device maintaining the DP log) entered or left the network. When a DP message is received at a node X and has a new source device ID Y, a record in the log file can be generated identifying the device ID and containing Begin and End timestamps. Initially the Begin and End timestamps are set to the time the message is received. Each time a new DP message is received at node X from that same source device Y, the End timestamp for the corresponding log entry is updated to be the current time. As the node device Y stays in the network and continues to originate new DP messages that are received at node device Y, the End timestamp will continue update. This data allows for easy tracking of a Node's relative up-time and availability within a maximum hop distance in the network. The log entry records can also specify the interface from which the respective DP messages are received. This can provide more data granularity that can be used to determine a break in a connection between node X and node Y even if other paths between them exist. The DP log file would not have records age out by default but instead be cleared at a node device reboot or records selectively cleared based on available allocated memory. DP log files can also be uploaded periodically to a remote storage, such as accessible to network administrator. An upload can also be triggered when the log file size is close to the available memory size, after which older log file records can be purged.

Figures 12A, 12B:
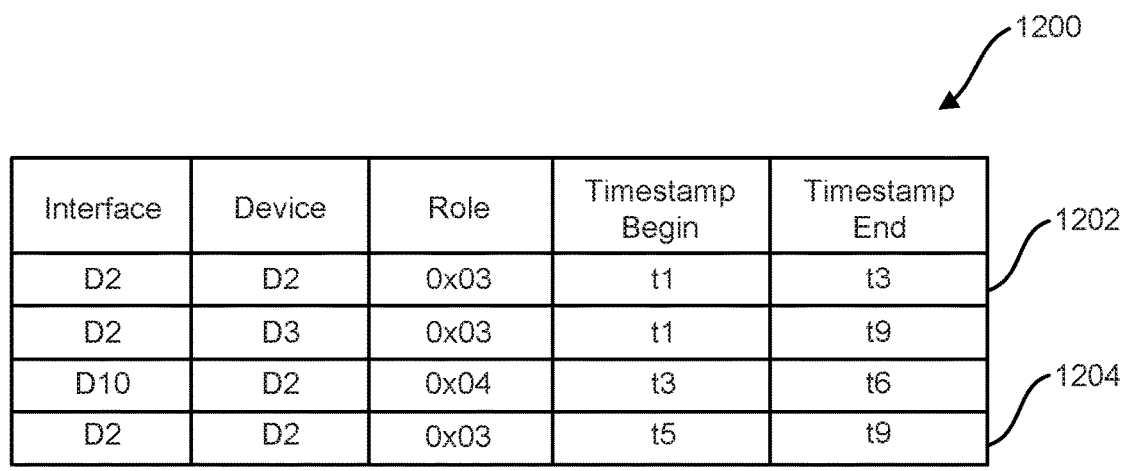
FIGS. 12A and 12B show records and a record format of a device presence log file according to an embodiment.

FIG. 12A shows sample records of a particular DP log file 1200. The records indicate start and end timestamps for paths from node D1 of FIG. 3 to node D2 from adjacent nodes D2, D3, and D10. As shown, for example in row 1202, node device D2 remained connected to D1 from time t1 through time t3. As shown in row 1204, it reconnected at time t5 and remained connected through time t9. FIG. 12B shows a particular format for entries in a DP log table of FIG. 12A indicating the size in bytes of each data value. In this embodiment, each DP log record utilizes 25 bytes per row.

The DP Table of a node device can uploaded by that device to a remote storage or returned to a requesting device in response to a received device presence query. DP Table data can be sent by the node device over the mesh network or via a different communication path available to the node device. In an embodiment, all of the data in the DP Table data is sent in response to a query. If the query specifies data conditions, the DP Table data can be filtered as appropriate and only certain record data returned. For example, a query may request DP Table records having adjacent nodes as origination devices or request all records for a specified origination node device.

This query feature allows for a central device, such as a network administrator, to easily collect information about node devices in the network and determine the current connectivity between those devices. By obtaining and combining DP table data from multiple nodes in the network, a complete picture of the current mesh network architecture can be developed.

Figure 13:
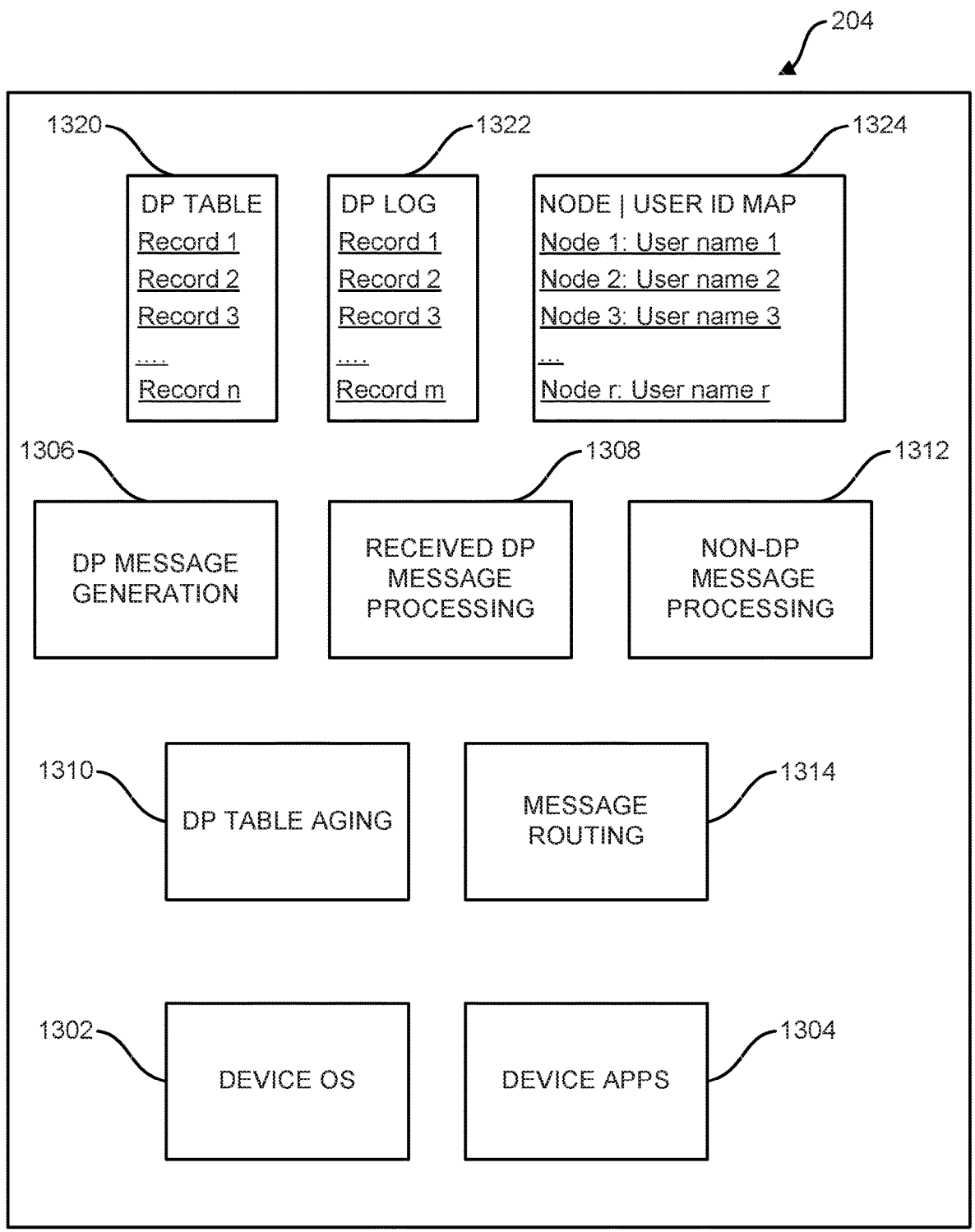
FIG. 13 is a high level representation of memory contents in a particular embodiment of a node device according to an embodiment.

FIG. 13 is a high level representation of memory contents 204 in a particular embodiment of a node device, such as device 200. The memory 204 in node device 200 generally contains the operating system 1302 and can hold one or more device Apps 1304. With reference to an embodiment of the invention as discussed herein, the various functions can be divided into different software engines that can operate as, for example, separate program threads. In this embodiment, computer software for controlling the processor 202 can comprise a DP message generation engine 1306 implementing functions such as shown in FIG. 7. A Received DP Message Processing engine 1308 implements functions such as shown in FIG. 8. A DP Table Aging engine 1310 implements functions such as shown in FIG. 9. A Non-DP Message Processing engine 1312 implements functions such as shown in FIGS. 10 and 11. Various data tables can be stored in allocated areas memory, including a DP Table, 1320, a DP Log 1322, and Mapping file 1324 with data to map device node IDs to user names. A Message Routine engine 1314 functions to determine least hop paths to a destination node based on contents of the DP Table and identify adjacent node or nodes to which a message should be sent. Various types of operating and temporary data can also be stored in memory. Alternative ways of organizing and implementing the functionality as discussed herein can be used instead.

The method and system presented herein provides an improvement to the technology underlying a mesh network. It allows nodes in the mesh network to efficiently obtain information about other nodes in the network and their relative position in the network. It also allows for messages in the network to be more efficiently routed and for data about network structure and operability to be easily collected.

Particular implementations of the DP Table and DP log can be efficiently stored in memory and the device presence functionality addressed herein implemented using a low power processer. This allows the invention to be implemented in small, low-power devices, such as used in IoT mesh networks.

The invention can be implemented on top of a computing device's application layer. This allows it to be used without any modification of the physical or lower level network layers and it is operable within conventional network protocols. As such, the invention can be implemented in any network topology.

Various aspects, embodiments, and examples of the invention have been disclosed and described herein. Modifications, additions and alterations may be made by one skilled in the art without departing from the spirit and scope of the invention as defined in the appended claims.

What is claimed is:

1. A communication device comprising:
   a processor;
   at least one a network interface coupled to the processor and configured to communicate with a network having a including a plurality of devices connected as network nodes and having respective unique network node IDs;
   a memory having a device presence table and computer instructions stored therein specifying a process executable by the processor, the device presence table comprising records, each record having respective a source node value, an origination node value, and a hop count value, the process when executed operable to cause the processor to:
       generate a first originated device presence ("DP") message, each DP message comprising an origination node ID value and a hop count value, wherein the first originated DIP message origination node ID value is the node ID of the communication device and the hop count value is one;
       broadcast the first originated DP message to at least one adjacent node on the network;
       store, in response to receipt of an incoming DP message from a particular adjacent node in the network, a corresponding record in the device presence table, the corresponding record associated with the incoming DP message and having the respective ID of the particular adjacent node as the corresponding record source node value, having the respective origination node ID value in the incoming DP message as the particular record origination mode value, and the respective hop count value in the incoming DP message as the respective record hop count value;
       send an outgoing second DP message to a second adjacent node on the network, the outgoing DP message having as the respective origination node value the origination node value of the incoming DP message and having as the respective hop count value the hop count of the incoming DP message incremented by one; and
       generate, in response to receiving a first communication directed to a destination, generating a first non-DP message comprising a payload and specifying a destination node ID corresponding to the destination and send the first non-DP message to a particular adjacent node selected using record data in the device presence table.

2. The system of claim 1, process when executed further operable to cause the processor to identify within a set of records having the destination node as the respective originating node value a respective record in the set with the smallest respective hop count value, wherein the particular adjacent node is source node value of the identified respective record.

3. The system of claim 2, wherein the communication device further comprises a display and a user input device, the process when executed further operable to cause the processor to:
   indicate on the display, based on records in the device presence table, devices that are present in network; and
   receive via the user input message data and a selected destination, the first communication comprising the message data the destination being the selected destination;
   wherein the payload of the first non-DP message comprising the message data and the destination node ID of the first non-DP message is the unique node ID of the selected destination.

4. The system of claim 2, wherein the first communication is a second non-DP message received from an adjacent node in the network and specifying the respective destination node ID, the payload of the first non-DP message comprising at least part of a payload of the second non-DP message.

5. The system of claim 1, each device presence table record further comprising a respective aging count value, the process when executed further operable to cause the processor to:
store, in response to receipt of the incoming DP message, an initial count value as an aging count value of the corresponding record;
periodically adjust for records in the device presence table the respective aging count values; and
remove from the device presence table records having respective aging count values at a predefined threshold.

6. The system of claim 1, the process when executed further operable to cause the processor to send the outgoing DP message only if the hop count of the incoming DP message is less than a predefined threshold.

7. The system of claim 1, each DP message further comprising a sequence number, the process when executed further operable to cause the processor to store, in response to receipt of the incoming DP message, the respective sequence number as a sequence value of the corresponding record.

8. The system of claim 1, the process when executed further operable to cause the processor to the process further operable to respond to receipt of a device presence query from a requester by returning to the requester information from the device presence table indicating devices present in the network.

9. A method for operating a node device having a and memory and a network node ID, the node device connected to a plurality of adjacent nodes in a mesh network including first and second adjacent nodes, each node of the mesh network having a respective unique network node IDs, the method comprising the steps of:
generating a first originated device presence ("DP") message, each DP message comprising an origination node ID value and a hop count value, wherein the first originated DP message origination node ID value is the node ID of the communication device and the hop count value is one;
sending the first originated DP message to the first adjacent node and the second adjacent node;
receiving an incoming DP message from the first adjacent node;
accessing a device presence table in the memory, the device presence table comprising records, each record having respective a source node value, an origination node value, and a hop count value
storing a new record in the device presence table, the new record associated with the incoming DP message and having the respective ID of the first adjacent node as the corresponding record source node value, having the respective origination node ID value in the incoming DP message as the particular record origination mode value, and the respective hop count value in the incoming DP message as the respective record hop count value;
sending an outgoing DP message to the second adjacent node on the network, the outgoing DP message having as the respective origination node value the origination node value of the incoming DP message and having as the respective hop count value the hop count of the incoming DP message incremented by one;
receiving a first communication directed to a destination; and
in response to receiving the first communication, generating a first non-DP message comprising a payload and specifying a destination node ID corresponding to the destination, and sending the first non-DP message to a particular adjacent node selected using record data in the device presence table.

10. The method of claim 9, further comprising the steps of identifying within a set of records in the DP Table having the destination node as the respective originating node value a respective record in the set with a smallest respective hop count value, wherein the particular adjacent node is source node value of the identified respective record.

11. The method of claim 10, wherein the communication device further comprises a display and a user input device, the method further comprising the steps of:
indicating on the display, based on records in the device presence table, devices that are present in the network;
receiving via the user input message data and a selected destination, the first communication comprising the message data and wherein the destination of the first communication is the selected destination; the payload of the first non-DP message comprising the message data and the destination node ID of the first non-DP message is the unique node ID of the selected destination.

12. The method of claim 10, wherein the first communication is a second non-DP message received from an adjacent node in the network and specifying the respective destination node ID, the payload of the first non-DP message comprising at least part of a payload of the second non-DP message.

13. The method of claim 9, each device presence table record further comprising a respective aging count value, the method further comprising the steps of:
in response to receipt of the incoming DP message, storing an initial count value as an aging count value of the corresponding record;
periodically adjusting for records in the device presence table the respective aging count values; and
removing from the device presence table records having respective aging count values at a predefined threshold.

14. The method of claim 9, further comprising the step of, prior to sending the outgoing DP message, determining of if the hop count of the incoming DP message is less than a predefined threshold, the step of sending the outgoing DP message contingent on the hop count threshold determination.

15. The method of claim 9, wherein each DP message further comprises a sequence number, the method further comprising the step of, in response to receipt of the incoming DP message, storing the respective sequence number as a sequence value of the corresponding record.

16. The method of claim 9, further comprising the step of, in response to receipt of a device presence query from a requester returning to the requester information from the device presence table indicating devices present in the network.

* * * * *